United States Patent [19]
Watson et al.

[11] Patent Number: 6,068,672
[45] Date of Patent: May 30, 2000

[54] FUEL ADDITIVE DELIVERY SYSTEM

[75] Inventors: Charles J. Watson, Rochester Hills, Mich.; Lawrence E. Egle, Sarasota, Fla.

[73] Assignee: Walbro Corporation, Cass City, Mich.

[21] Appl. No.: 09/141,487

[22] Filed: Aug. 27, 1998

Related U.S. Application Data

[63] Continuation-in-part of application No. 08/801,551, Feb. 18, 1997, abandoned.
[51] Int. Cl.[7] ............................. F01N 9/00; F02M 43/00
[52] U.S. Cl. ............................... 44/629; 44/639; 44/903; 123/1 A
[58] Field of Search ........................ 44/903, 629, 639; 123/1 A

[56] References Cited

U.S. PATENT DOCUMENTS

| | | | |
|---|---|---|---|
| 4,214,615 | 7/1980 | Boyer | 123/1 A |
| 4,253,436 | 3/1981 | Dudrey | 123/1 A |
| 4,440,115 | 4/1984 | Allen | 123/1 A |
| 4,621,593 | 11/1986 | Rao et al. | 123/1 A |
| 5,331,994 | 7/1994 | Bryan, III et al. | 123/1 A |
| 5,441,072 | 8/1995 | Indey et al. | 123/1 A |

FOREIGN PATENT DOCUMENTS

| | | |
|---|---|---|
| 0590814 | 4/1994 | European Pat. Off. . |
| 0661429 | 7/1995 | European Pat. Off. . |
| 9013115 | 4/1992 | France . |
| 9302046 | 9/1994 | France . |
| 9404513 | 10/1995 | France . |
| 3836602 | 5/1990 | Germany . |
| 60-254997 | 5/1987 | Japan . |
| 2176842 | 1/1987 | United Kingdom . |

OTHER PUBLICATIONS

EOLYS ™–1. Executive Summary—Phone–Poulenc—Section 1—Feb. 1995.
EOLYS ™–4. Impact of Eolys™ On Soot Formation & Oxidation—Rhone–Poulenc—Section 4—Feb. 1995.
EOLYS ™–6. Trap–Related Properties—Rhone–Poulenc—Section 6—Feb. 1995.
EOLYS ™–The Eolys™ Concept (5)–Phone–Poulenc—Secteur Chimie.

*Primary Examiner*—Jacqueline V. Howard
*Attorney, Agent, or Firm*—Reising, Ethington, Barnes, Kisselle, Learman & McCulloch, P.C.

[57] ABSTRACT

A fuel dosing system to provide a controlled level of cereum additive from an additive tank either within or external to a diesel powered vehicle's fuel storage tank. The present invention maintains a concentration of cerium that is optimized to assure proper regeneration of a particulate trap used to control particulate emissions from the vehicle's exhaust. The present invention determines the additive dosage required by monitoring the fuel added to the tank during refueling of the vehicle and responds with a proper dose of an optimized amount of additive. The present invention is self contained and imposes a minimum encroachment on the vehicle fuel and electrical system and may also provide appropriate alarm signals to warn of additive depletion and other possible malfunctions.

19 Claims, 6 Drawing Sheets

FUEL ADDITIVE DELIVERY SYSTEM

This application is a continuation-in-part of application Ser. No. 08/801,551 filed Feb. 18, 1997 and abandoned in favor of this application.

FIELD OF THE INVENTION

This invention relates to fuel delivery systems generally, and more particularly, to a fuel additive delivery system to provide a controlled level of an additive to a fuel tank of a diesel engine.

BACKGROUND OF THE INVENTION

Certain vehicular or industrial applications use engines that require a fuel additive. In particular, a diesel fuel engine may require an additive, such as cerium, to be added to the fuel prior to the combustion process. Due to increased concerns about emissions from internal combustion engines, as well as other sources, it has become a design constraint to reduce the overall level of emissions created. As a result, in the example of a diesel engine, the amount of cerium added to the fuel must be precisely controlled to optimize particulate control and minimize the environmental impact.

Previous approaches for mixing an additive with a fuel in a system suffer from problems in providing an accurate dose of additive. If the proper dose of additive is not realized, additional problems are created in that the amount of emissions may be increased to an unacceptable level. Additionally, an unused amount of additive must be recovered from the system after the useful life of the device has expired. If the dose of fuel additive is not accurately controlled, the additive tank must be increased to a larger size to accommodate larger amounts of additive that may not be required in the useful life of the system. As a result, it would be desirable to provide a system for mixing a fuel additive with a fuel that provides a precise amount of additive in response to refueling conditions.

U.S. Pat. No. 4,621,593 discloses an apparatus for adding a fluid agent to the fuel supply of an automotive engine. The reference generally requires the use of an additional fuel system level sender, requires a switch at the fuel cap for refueling recognition, suffers from difficulties in false level measurements due to non-level vehicle attitude, suffers from improper dosing during a power down situation during refueling and requires solenoid power during a condition when the vehicle is powered off. Additionally, the apparatus dispenses the additive in the main delivery line which may result in inadequate mixing, uses analog circuitry which may provide inaccurate dosing values and uses vulnerable high current control within the fuel tank for excitation of the pump which may create potentially hazardous conditions.

An alternate previous approach may be found in the publication entitled EOLYS™, published by Rhone-Poulenc on Feb. 19, 1995. Such approaches consist of either premix of additive in the fuel by the fuel supplier or local mixing at the refueling station. Neither is acceptable for the foreseeable future since vehicles not equipped with the particular trap would pass thru the oxides of cerium which are detrimental to the environment.

SUMMARY OF THE INVENTION

This invention concerns a fuel dosing system to provide a controlled level of cerium or other additive from an additive tank within a diesel powered vehicle's fuel storage tank. The present invention maintains a concentration of cerium additive that is optimized to assure proper regeneration of a particulate trap used to control particulate emissions from the vehicle's exhaust. The present invention determines the additive dosage required by monitoring the fuel added to the tank during refueling of the vehicle and responds with a proper dose of an optimized amount of additive to be mixed with the stored fuel. Precise amounts of additive are essential to assure proper regeneration at low vehicle operating loads, yet not be excessive so as to overdose and contaminate the particulate trap. The particulate trap must also trap all cerium added to the fuel to avoid emissions into the environment. Since all the cerium is trapped in the particulate trap, the size, and therefore the cost of the system, are influenced by the precision of the amount of dosing. It is generally desirable to provide a sufficient amount of additive to allow proper operation of the vehicle throughout the useful life of the vehicle without providing more additive than necessary. The present invention is self contained and imposes a minimum encroachment on the vehicle fuel and electrical system. It also provides appropriate alarm signals to warn of additive depletion and other possible malfunctions.

Objects, features and advantages of the present invention include providing a fuel dosing system to mix a controlled level of additive into a fuel delivery system that poses a minimum encroachment on the vehicle fuel and electrical system, provides appropriate alarm signals to warn of additive depletion or other malfunctions, provides sufficient additive to last a lifetime of the vehicle and provides precise amounts of additive to assure proper regeneration at low operating loads.

BRIEF DESCRIPTION OF THE DRAWINGS

These and other objects, features and advantages of this invention will be apparent from the following detailed description of the preferred embodiment(s) and best mode, appended claims and accompanying drawings in which:

DETAILED DESCRIPTION OF THE PREFERRED EMBODIMENTS

The present invention provides a fuel dosing system to provide a controlled level of additive to the fuel of a diesel powered vehicle that monitors the level and hence quantity of fuel before and after a refueling process in order to determine a precise amount of additive, such as cerium, to be mixed with the fuel after refueling. The present invention compensates for time lags in the fuel sensor, the motion of the vehicle subsequent to the refueling process and other factors that may cause an initial and subsequent fuel level calculation to be in error. As a result, the amount of additive is closely regulated to reduce the overall environmental impact of the system.

Figure 1:
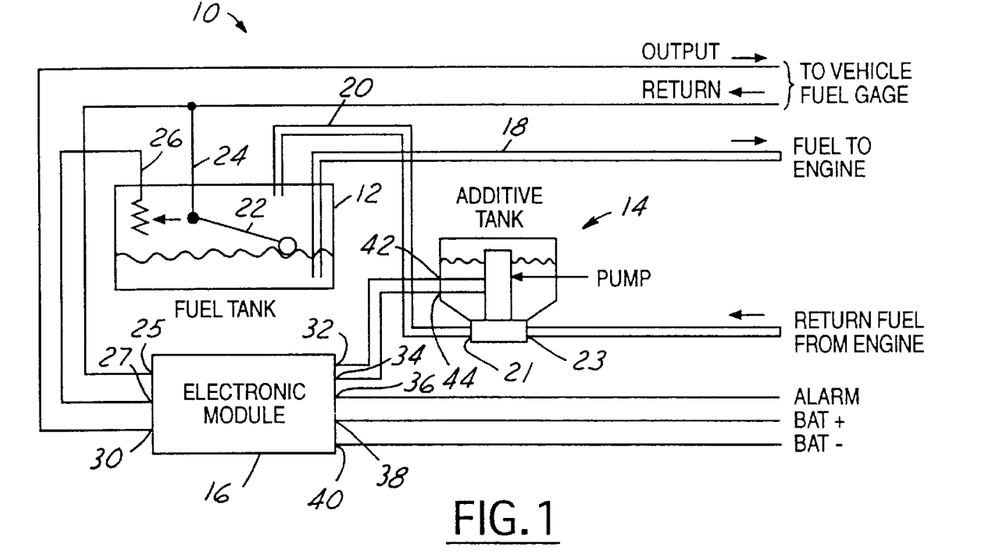
FIG. 1 is a block diagram of the overall architecture of a preferred embodiment of the present invention.

Referring to FIG. 1, a system 10 is shown in accordance with the preferred embodiment of the present invention. The system 10 generally comprises a fuel tank 12, an additive system 14 and an electronic module 16. The fuel tank 12 has a fuel line 18 that provides fuel to the engine (not shown). The fuel tank 12 also has a fuel line 20 that receives additive from the additive system 14. The additive tank has a return fuel line 21 that sends additive to the fuel tank 12 as well as a fuel line 23 that receives unburned fuel from the engine. The fuel tank 12 also comprises a level sensor 22 that provides an electrical signal at an output 24 and at an output 26. The output 26 presents an electrical signal indicating the level of fuel in the fuel tank 12 that is generally presented to both the fuel gauge (not shown) as well as to the electronic module 16. The output 24 generally presents an electrical return signal that is presented to the electronic module 16 and is common to vehicle negative battery terminal.

The electronic module 16 has an input 25 that receives the signal from the output 24 of the fuel tank 12 and an input 27 that receives the output 26 of the fuel tank 12. A single level sensor 22 may be used by both the electronic module 16 and the vehicle fuel gage. The electronic module 16 also presents an output 30 to the vehicle fuel gauge (not shown). The electronic module 16 presents signals at a number of outputs 32, 34 and 36 and receives signals at an input 38 and an input 40. The outputs 32 and 34 are generally presented to an input 42 and an input 44 of the additive system 14. The output 36 generally presents an alarm signal that indicates if a problem occurs with the additive system 14. A problem with the additive system 14 that may trigger the alarm signal may be, for example, that the additive system 14 is out of cerium additive. The input 38 generally is connected to the positive terminal of the battery while the input 40 is generally connected to the negative terminal of the battery.

Figure 2:
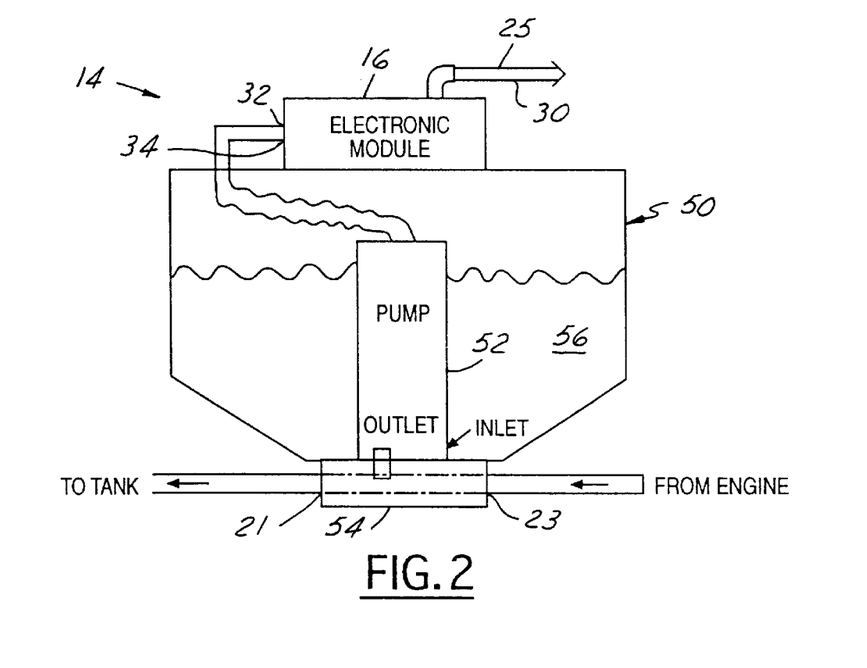
FIG. 2 is a more detailed diagram of the additive delivery system.

Referring to FIG. 2, the additive system 14 is shown in greater detail. The electronic module 16 is shown physically mounted directly on top of a tank 50. The additive system 14 generally comprises a pump 52 and a manifold/heat exchanger 54. The pump 52 generally provides additive to the fuel tank 12 through the output 21. The additive is added to the fuel received from the engine at the fuel line 23. The tank 50 is shown filled with an additive 56. The additive may be cerium or any other additive necessary to be added to an engine fuel.

The pump 52 is generally a fine resolution pump capable of providing a consistent and precise amount of additive to be pumped to the fuel line 21 during each stroke of the pump. The pump 52 may be implemented as a positive displacement solenoid actuated pump that injects additive into the return fuel line 23. Other types of pumps may include a piston pump, a diaphragm pump or a rotary cyclic pump. While the amount of additive pumped during each stroke of the pump is generally consistent, the particular volume of additive pumped during each stroke may be adjusted to fit the design criteria of a particular application. For example, if the level sensor 22 in the fuel tank 12 is of a high resolution, the volume per pump stroke is generally reduced, requiring more pump strokes to produce the desired amount of additive. As a result, a more precise control of the amount of additive mixed in the fuel tank 12 may be realized. In one example, ten pump strokes may be required to dose one gallon of fuel. Additionally, the pump 52 may be designed such that only the desired amount of additive is added to the fuel with any excess additive being retained in the pump 52 via, for example, a capillary at the interface between the pump 52 and the fuel line 21. The pump 52 generally operates when the engine is running after refueling of the fuel tank 12 is complete.

The manifold/heat exchanger 54 may be employed to utilize heat from the returned fuel to elevate the temperature of the additive 56 under extremely low temperature conditions. As a result, the overall fluid viscosity of the additive 56 is generally stabilized which assures accurate metering under rapid delivery rates. The additive 56 may be directly mixed with the fuel in the fuel tank 12 or may be mixed with the return fuel through the manifold/heat exchanger 54. Submersion of both the inlet and discharge ports including a final discharge point so may prevent evaporation of the fluid carrier which may result in development of crystals or exceedingly viscous fluid or solids at the inlet or discharge points of the system 10. Development of such a condition may result in clogging or such restriction which may cause inconsistent delivery of the fluid, especially when rapidly delivering such fluid.

Figure 3:
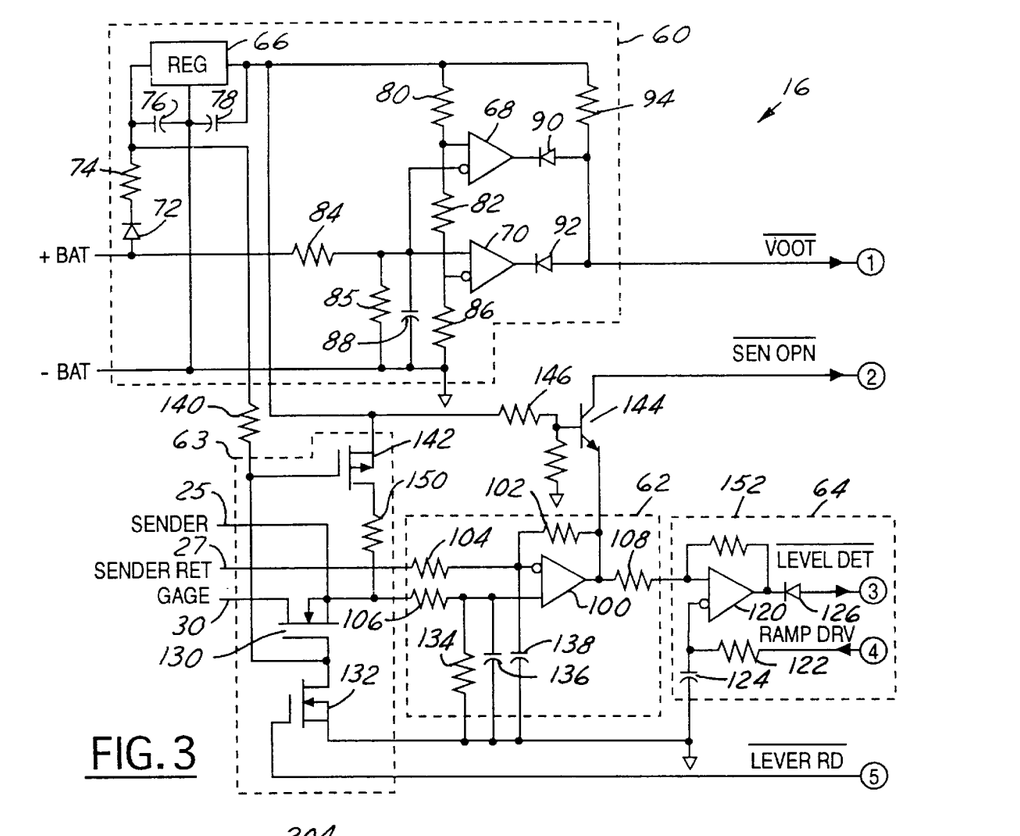
FIG. 3 is a schematic diagram of a first portion of the electronic control system of the present invention.

Referring to FIG. 3, a circuit diagram of a first portion of the electronic control block 16 is shown. The electronic control block 16 generally comprises a voltage conditioning circuit 60, a differential input amplifier 62, a voltage conditioning circuit 63 and a comparator circuit 64. The voltage conditioning circuit 60 generally comprises a regulator 66, a comparator 68 and a comparator 70. The regulator 66 receives a positive battery voltage through a diode 72 and a resistor 74. A capacitor 76 and a capacitor 78 generally provide capacitive decoupling for the regulator 66. An output of the regulator 66 is presented through a resistor 80, to a non-inverted input of the comparator 68, and is presented through a resistor 82, to an inverted input of the comparator 70. The positive battery voltage is also presented, through a resistor 84, to an inverted input of the comparator 68 as well as to a non-inverted input of the comparator 70. A negative battery voltage is generally coupled, through a resistor 86, to the non-inverted input of the comparator 68 as well as to the inverted input of the comparator 70. A resister 85 is generally coupled between both the negative battery voltage and the non-inverting input of the comparator 70 and the inverting input of comparator 68. A capacitor 88 also couples the negative battery voltage to the inverted input of the comparator 68. An output of the comparator 68 presents, through a diode 90, an output signal VOOTB, which represents an active low signal indicating the battery voltage is out of tolerance. An output of the comparator 70 is combined, through a diode 92, with the output of the comparator 68 to present the signal VOOTB. A resistor 94 generally provides a pullup feedback path from the wired-or output of the comparators 68 and 70.

The voltage conditioning circuit 60 generally identifies if the battery voltage is out of tolerance, which may adversely affect the operation of the pump 52. During such a condition, the signal VOOTB suspends signal processing and operation of the pump 52 and provides a shut down of the system 10. During such a shut down, the current number of strokes of the pump 52 remaining to be executed, if any, may be stored in the memory 162 (to be described in more detail in connection with FIG. 4) for execution upon restarting of the system 10.

The differential input amplifier 62 generally comprises an amplifier 100, a resistor 102, a resistor 104, a resistor 106 a resistor 108, a resistor 134, a capacitor 136 and a capacitor 138. The differential input amplifier 62 generally provides immunity from system ground currents by avoiding common mode signals between the gauge and the sender return line. The resistor 134 and the capacitor 136 are coupled between a non-inverted input of the comparator 100 and ground. The capacitor 138 is generally coupled between an inverted input of the comparator 100 and ground.

The comparator circuit 64 generally comprises a comparator 120, a resistor 122, a capacitor 124 and a diode 126. The comparator circuit 64 generally provides an analog to digital conversion for use with other portions of the electronic module 16. The voltage condition circuit 63 generally comprises a transistor 130, a transistor 132 and a transistor 142.

A signal received at the input 25 is generally presented to the comparator 100 through the resistor 106 as well as to an input of the transistor 130. The transistor 130 is generally coupled to the transistor 132. A signal at the input 27 is presented to the comparator 100 through the resistor 104. A pull-up voltage is presented between the transistor 130 and the transistor 132 through a resistor 140. The resistor 140 is also coupled to the transistor 142. A regulated voltage signal is presented to the transistor 142 as well as to a transistor 144 through a resistor 146. The transistor 144 provides a signal SENOPNB which is an active low signal that indicates when the circuit senses an open sender condition. The comparator 64 provides a signal LEVELDETB which is an active low signal that provides level information from the fuel tank 12. The comparator 64 also receives a signal RAMPDRV. The transistor 132 receives a signal LEVELRDB. A resistor 150 and a resistor 152 provide hysteresis for the comparator 120. A resistor 154 provides a voltage divider for the input of transistor 144.

Figure 4:
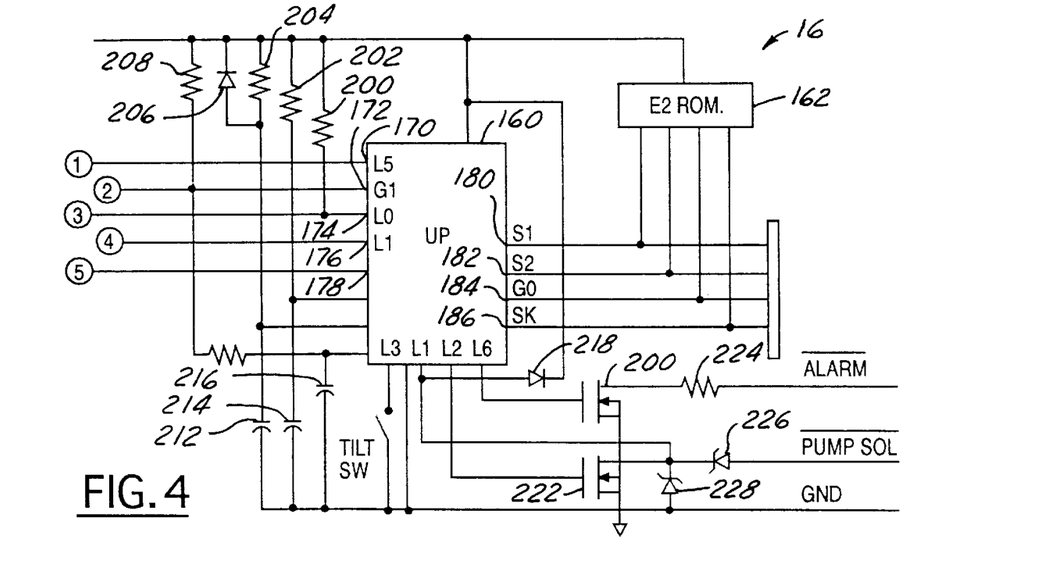
FIG. 4 is a schematic diagram of a second portion of the electronic control system of the present invention.

Referring to FIG. 4, a second portion of the electronic module 16 is shown. The electronic module 16 also comprises a microprocessor 160, a memory 162 and a test connector 164. The microprocessor 160 has an input 170 that receives the signal VOOTB, an input 172 that receives a signal SENOPNB, an input 174 that receives the signal LEVELDETB, an output 176 that provides the signal RAMPDRV and an output 178 that provides the signal LEVELRDB. The microprocessor 160 has an output 180, an output 182, an output 184 and an output 186 that provide information to the test connector 164 as well as to the memory 162. The output 180 provides a read signal, the output 182 provides a write signal, the output signal 184 provides a data signal and the output 186 provides a clock signal. The outputs 180, 182, 184 and 186 provide signals to external test equipment that may be used to monitor or program the microprocessor 160 and the memory 162. Additionally, the look-up table stored in the memory 162 may be programmed with specific values during the manufacturing process of the vehicle. The transistor 130 provides a switch connected to the input 27 to gage the level input at all times except when the electronic module 16 is monitoring the sender input 27.

A tilt switch 190 may be included on the electronic module 16 to provide a cutoff signal that suspends measurement by the system 10 in the event of a tilted vehicle fuel tank or a vehicle under acceleration. A resistor 200, a resistor 202, a resistor 204, a diode 206, a resistor 208, a resistor 210, a capacitor 212, a capacitor 214, a capacitor 216 and a diode 218 provide support circuitry for the microprocessor 160 which is well known in the art. A transistor 220 and a transistor 222 provide a signal ALARMB and a signal PUMPSOLB respectively. The signal PUMPSOLB is an active low signal that controls the solenoid of the pump 52. A resistor 224, a diode 226 and a diode 228 provide support circuitry for the transistors 220 and 222. The transistors 220 and 222 are shown as MOSFET devices. Other devices could be substituted, such as a pair of bipolar transistors, which may eliminate the need for the diodes 226 and 228.

The memory 162 is generally used to store data tables, or look-up tables, containing sensor output voltage versus actual tank volume conversion factors. The memory 162 may also be used for processing status values during power interrupt. Generally, a first level is sampled by the level sensor 22, then a second level is sampled by the level sensor 22. A comparison between the two samples is used to determine the amount of fuel that has been added to the fuel tank 12. Based on this value, the microprocessor 160 determines the amount of additive needed to be mixed into the fuel tank 12. The look-up table provides information on the number of pump strokes necessary for the particular pump 52 implemented in the system 10.

Figure 5:
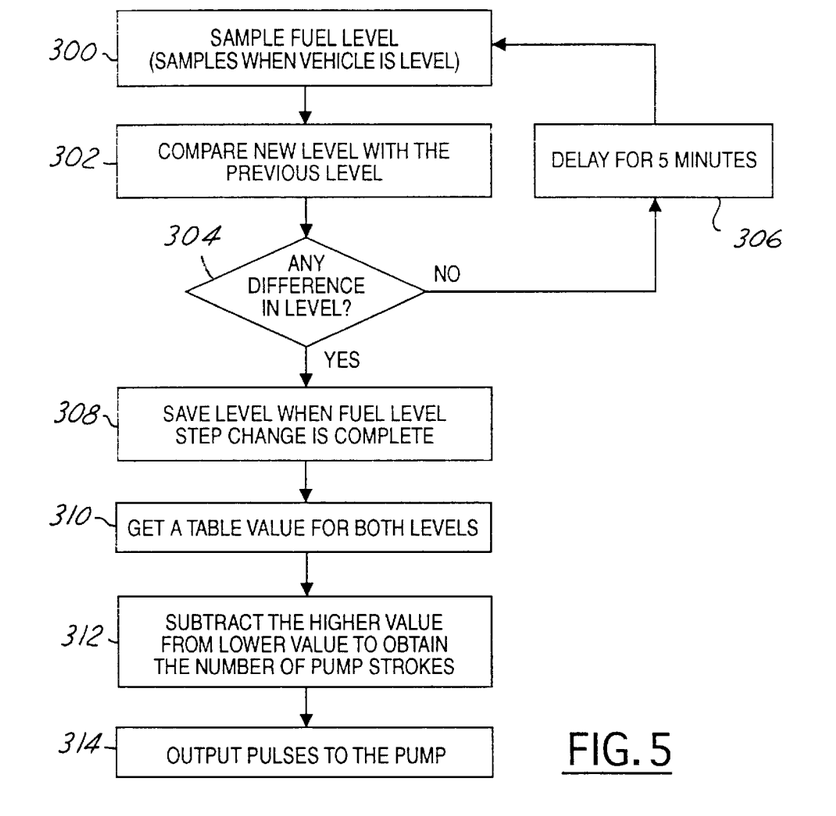
FIG. 5 is a flow chart of the calculation used to determine the additive dose.

Referring to FIG. 5, a flow chart of the operation of the calculation of the additive dose is shown. The general methodology proceeds by calculating a new fuel level at a box 300. A box 302 compares the new fuel level with the previous recorded level. A calculation of the difference in levels is performed at a diamond 304. If the levels are not significantly changed, the methodology proceeds to a box 306 which provides a delay, for example a 5 minute delay, before a new sample is taken. If a significant difference occurs, the methodology proceeds to box 308 which saves the level when the fuel level step change is complete. Next, the methodology proceeds to a box 310 which accesses one or more look-up tables to obtain appropriate values for the previous level and the new level. The methodology then proceeds to a box 312 which subtracts the higher value from the lower value and obtains the proper number of pump strokes. Finally, the methodology proceeds to a box 314 which presents the signal PUMPSOLB which executes a number of pump strokes by the pump 52.

The memory 162 may store information such as the total number of pump strokes since installation of the system 10. This information may be used for warranty or other purposes. The memory 162 may be implemented as an electrically erasable programmable read only memory (EEPROM) or other type of non-volatile memory.

In the case of an interruption of power during a refueling, the number of actual pump strokes is stored into a portion of the memory 162, such as a register. Upon resuming the mixing of additive, only the remaining number of pump strokes will be executed. As a result, overdosing the fuel is avoided.

Figure 6:
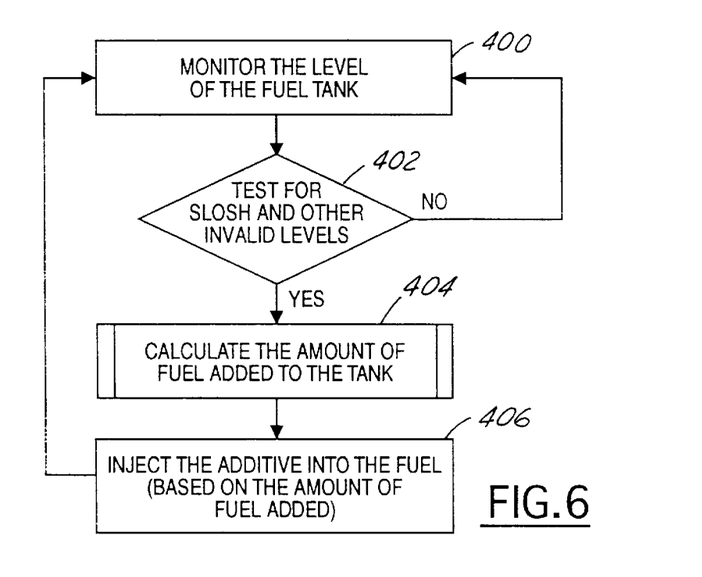
FIG. 6 is a flow chart of the operation of the additive pump.

Referring to FIG. 6, a flow chart of the operation of the fuel pump 52 is shown. A general methodology is shown which starts at a box 400 where the level of the fuel tank is monitored. The methodology proceeds to a diamond 402 where a number of tests for invalid levels are performed. If the diamond 402 determines that an invalid level has been obtained, the methodology returns to the box 400. If a valid level has been obtained, the methodology proceeds to a box 404 which calculates the amount of fuel added to the tank. Finally, the methodology proceeds to a box 406 which injects a dose of additive into the fuel based on the amount of fuel added.

The system 10 generally operates by taking measurements that are processed when the vehicle is not encountering accelerations, is generally level and the battery voltage is within normal operating limits. A number of conditions are generally sampled. In a preferred embodiment, 16 samples are taken and averaged before a particular value is stored. The process continues by comparing each averaged sample to the previous averaged sample to determine if the new sample exceeds a previous sample by more than a predetermined amount. If the predetermined amount is exceeded, the new value will generally be discarded under the assumption that the new value was obtained due to excessive fuel sloshing in the fuel tank 12. While the implementation of an excessive lock-out may be a partial redundancy with the implementation of a lock-out of the attitude sensing mercury tilt switch 190, it may be necessary to meet the design criteria of a particular application. Additionally, the tilt switch 190, when implemented as a mercury switch, may also sense static non-level conditions which could confuse and render inaccurate any measurement. Such conditions may result from a non-level refueling station surface, a vehicle condition during an up/down hill operation, continuous road curves or a high crest in the pavement.

It is generally advantageous to allow a period of time to elapse between the sampling periods. For example, in a preferred embodiment, five minutes or more may be required to elapse between sampling periods. Since the additive is generally mixed with the fuel after refueling, the time between sampling periods generally allows for complete refueling to take place, which generally occurs at a minimum rate of four gallons per minute under normal refueling conditions. As a result, an insurance that a positive change in fuel level has been recognized is realized so that the sample recorded represents a significant and measurable step function in the fuel level.

The computation of the required dosing is a comparison of the equivalent number of pump strokes corresponding to the last fuel level stored in the memory 162 prior to the positive change versus the new value. The electronic module 16 computes the number of pump strokes by subtracting the old (i.e., the lower level value) from the new value in a predetermined look-up table. The look-up table provides the number of pump strokes to be presented to the pump solenoid. The value is stored in a register of the memory 162 which is decremented as the pump delivers additive to the fuel tank 12. In the event of a power down or an out of tolerance condition, the remaining value is generally stored in the memory for storage or until the system 10 is again within the normal operating conditions.

The fuel tank 12 must be mapped in such a way to assure accurate volumetric values in order for the electronic module 16 to properly function. Such mapping is generally known in the art and is normally performed as a design task associated with the configuration of a particular fuel tank 12. While the absolute numbers are part of the design criteria, the changed values within the normal operating range provide important design constraints. The present invention may be adapted to aftermarket applications by implementing a throw-away programming apparatus as part of the electronic module 16 allowing for post production configuration of the system 10 to function with a variety of applications. The electronic module 16 may be connected using a microwire bus connection or any other appropriate bus circuit board connector.

The memory 162 in the electronic module 16 may store the total number of pump drive pulses to properly monitor the use of the system 10 for non-functional criterial, such as for determining if a warranty has expired. Additional features that the system 10 may implement include recognizing an open fuel sender or associated wiring difficultly, recognizing an open pump solenoid or associated wiring difficulty, recognizing a depleted cerium additive reservoir and presenting an output alarm to the vehicle instrument cluster or an associated computer system. Such conditions may trigger the alarm from the output 36.

Support circuitry associated with the normal operation of a microprocessor may include devices known in the art such as clock generators, resets, voltage regulators and input power conditioning devices to meet the various vehicle power transient design specifications.

Various modifications or combinations of the system 10 may be made without departing from the spirit and scope of the present invention. For example, the mercury attitude switch may be eliminated by using a computational algorhythum. The discrete circuitry may be integrated into an Application Specific Integrated Circuit (ASIC). The electronic circuitry may be incorporated into the pump 52 to reduce the overall amount of space required. The various electronic connections may be multiplexed onto a fewer number of interconnections in order to reduce the overall number of electronic connections.

Figure 7:
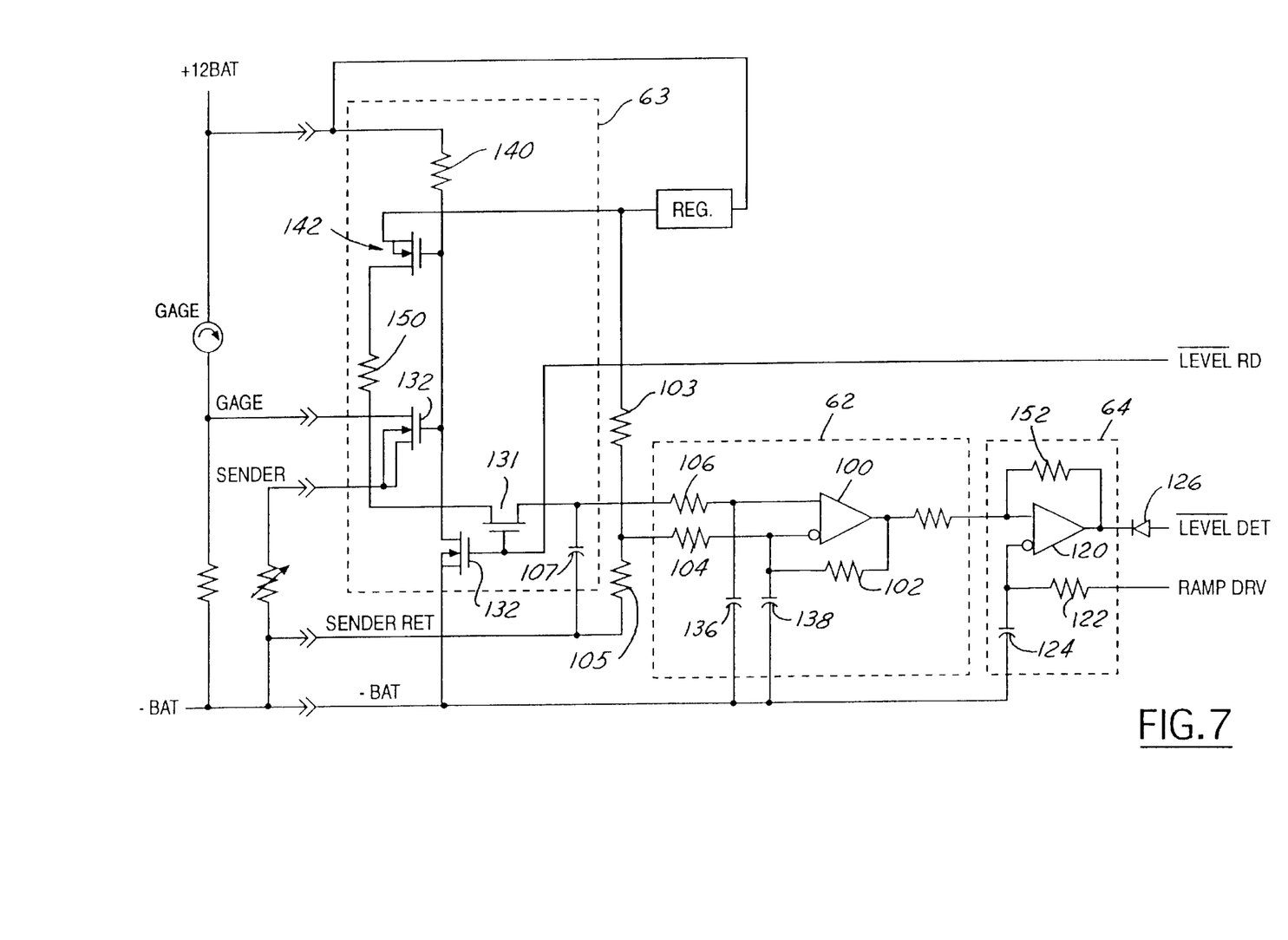
FIG. 7 is an alternate implementation of a portion of the schematic diagram of FIG. 4.

Referring to FIG. 7, an alternate implementation of the voltage conditioning circuit 63 is shown in context with the differential input amplifier 62 and the comparator circuit 64. A resistor 103 and a resistor 105 generally provide an offset correction for use with level sensors 22 which do not operate over a full range, which may leave a residue resistance at a full or empty setting. The voltage conditioning circuit 63 shows an alternate configuration of the transistors 130, 132, 142 and 150 as well as the addition of a transistor 131 and a capacitor 107. Transistor 142 operates as a driver for transistor 132 so as to provide a controlled current to the fuel level sensor, and thereby provide an accurate indication of fuel level to transistor 131. Amplifier 62 is a differential amplifier to immunize the fuel level sender signal against the effects of a noisy ground. Circuit 64 operates as a buffer, with capacitor 124 functioning as an integrator. The LEVEL DET signal to microprocessor 160 (FIG. 4) is a square wave signal having a frequency that is a function of fuel level. The return RAMP DRV signal from microprocessor 160 provides a constant current source for capacitor 124. The signal LEVEL RD is fed to microprocessor 160.

Figure 8:
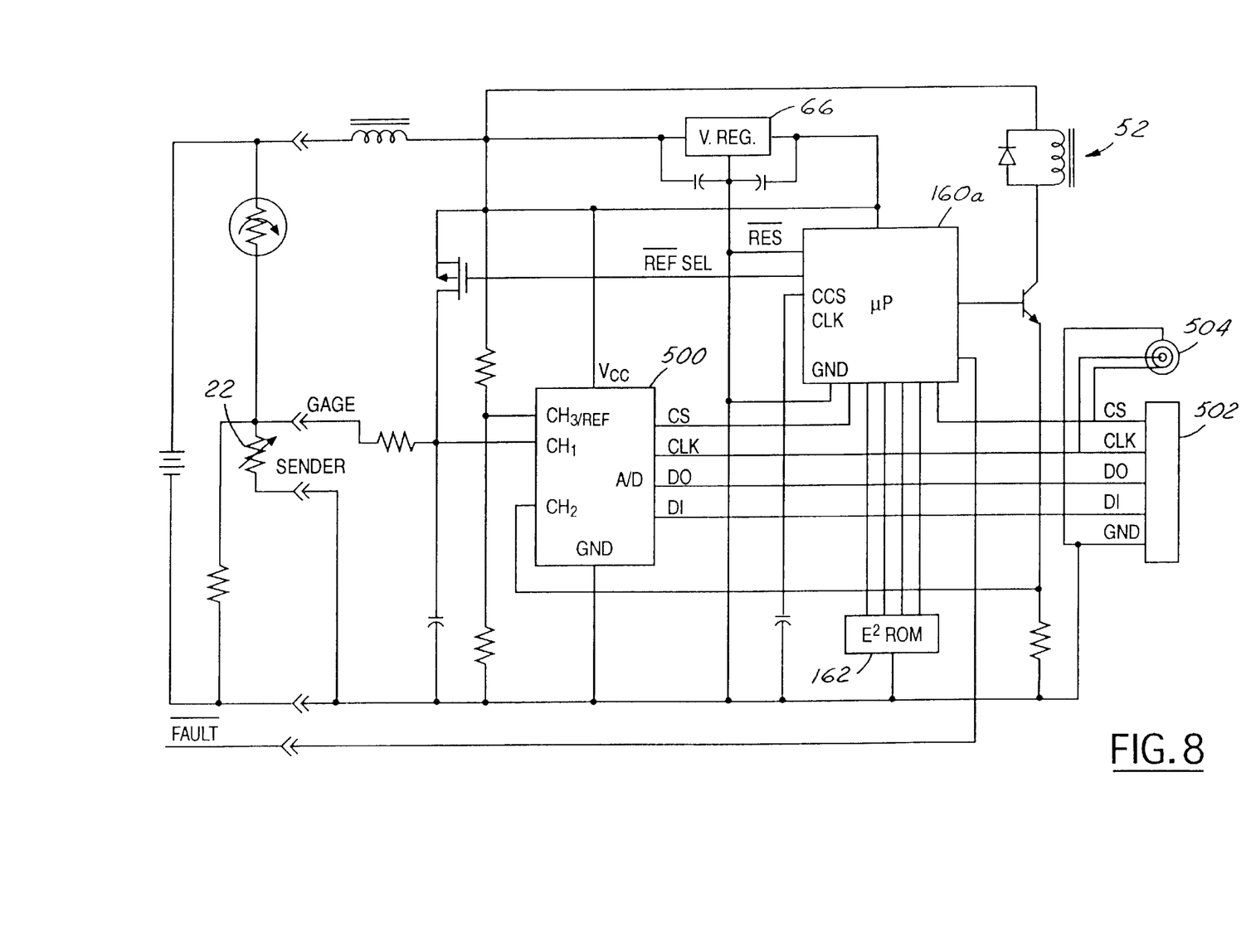
FIG. 8 is a schematic diagram of another modified embodiment of the invention.

FIG. 8 illustrates another modified circuit in accordance with the invention, in which the GAGE signal is fed through an a/d converter 500 to a microprocessor 160a. In general, microprocessor 160a cooperates with EEROM 162 to perform the functions previously described. Various sensor and control signals are provided to a parallel output port 502 and a serial output port 504 for calibration, testing and monitoring purposes. The circuit of FIG. 8 has the advantage as compared with the circuits previously described of requiring fewer individual components, with a major portion of the control logic being performed in microprocessor 160a.

Figures 9, 10:
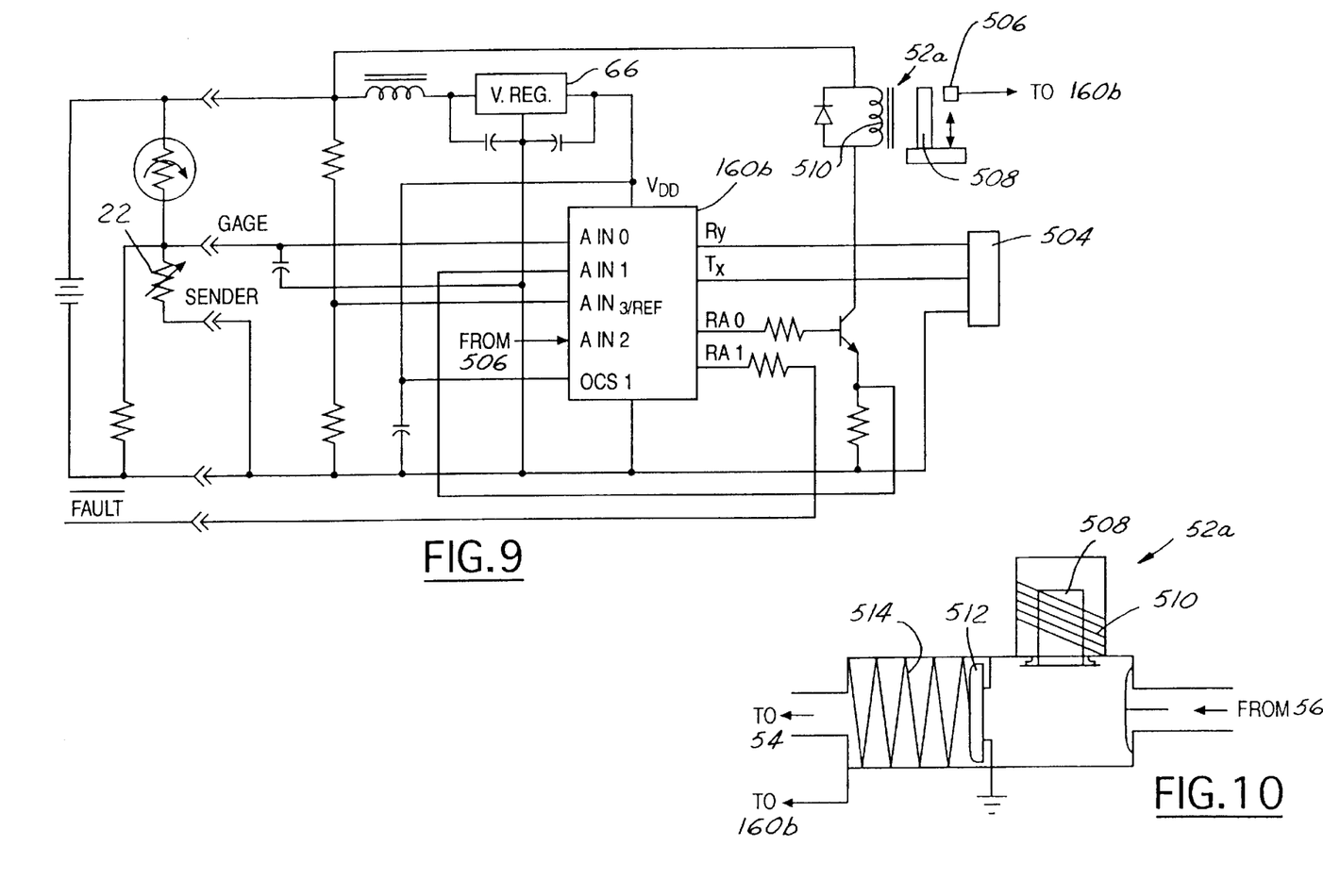
FIG. 9 is an electrical schematic diagram of a further modified embodiment of the invention.
FIG. 10 is a schematic diagram of a pump sensor in accordance with the present invention.

FIG. 9 illustrates another modified control circuit, in which the microprocessor 160b includes all necessary level sensing and control functions. Microprocessor 160b includes an a/d converter and multiplexer for receiving the input GAGE and SENDER signals. In both FIGS. 8 and 9, the actual battery voltage is compared to the sender output by utilizing the battery voltage (scaled down) as the reference to the a/d converter, thus creating a ratio-metric measurement. This improves the resolution of the measurement compared to the technique of utilizing a small-valued current-derived voltage measurement. The scaled down battery voltage used as a reference is also used to measure the actual battery voltage when the internal a/d reference is employed. The battery voltage measurement is also used to define an out-of-tolerance battery condition.

In the embodiments thus far described, it is assumed that each signal pulse to dosing pump 52 results in addition of a dosing quantity of fixed and predetermined amount. In other words, in each case, the desired dosing amount is first calculated based upon a change in fuel level from fuel level sender 22, and the fixed displacement pump is activated for a number of strokes corresponding to the amount of additive to be added to the fuel. If for some reason the additive pump does not respond fully, or at all, to any of the stroke pulses, the quantity of additive added to the fuel will be correspondingly incorrect. FIGS. 9 and 10 illustrate two techniques for addressing this problem.

In FIG. 9, a linear Hall sensor 506 is operatively coupled to the armature 508 of solenoid 52a for sensing movement of the armature responsive to a control pulse applied to the stator coil 510. Sensor 506 is connected to microprocessor 160b, which monitors the output of the sensor during a pump operating cycle to measure the stroke of the pump armature, and thereby compute the quantity of additive actually added to the fuel system. Additionally or alternatively, a check valve 512 (FIG. 10) may be added to the pump manifold and biased to a closed position by a coil spring 514. When pump armature 508 is energized, valve element 512 is lifted off of its seat against the force of spring 514 in response to a pressure increase only when fluid is present in the pump cavity. Such movement only responds to the pump armature (piston) and also indicates fluid flow. This signal can also be used to detect depletion of the fluid supply. Valve element 512 may be connected to suitable electrical contacts as shown so as to provide a signal to microprocessor 160b indicative of opening of the contacts, and thereby indicating operation of pump armature 508. This alternative senses operation of the pump during a stroke cycle, but does not directly measure the quantity of additive actually added by the fixed displacement pump, as does the Hall sensor embodiment of FIG. 9.

While the invention has been particularly shown and described with reference to the presently preferred embodiments thereof, it will be understood by those skilled in the art that various changes in form and details may be made without departing from the spirit and scope of the invention.

We claim:

1. An apparatus for mixing a fuel additive to a fuel comprising:
   a fuel tank for a vehicle;
   a level sensor mounted in said fuel tank for providing an electric signal indicative of the level of fuel in said fuel tank;
   an additive system for holding a supply of fuel additive;
   electric pump for dispensing a predetermined precise amount of said additive to fuel in said fuel tank in response to activation of the pump;
   an electronic control circuit having a microprocessor with a clock and a memory, the control circuit utilizing the electric signal of the level sensor to determine fuel levels, determining a first fuel level and storing the first fuel level in memory, determining at least one succeeding second fuel level lesser than the first fuel level and storing in memory such lesser second fuel level, subsequently determining a third fuel level significantly greater than the lesser second fuel level stored in memory, using the third fuel level and the last lesser second fuel level stored in memory to determine the amount of additive to be delivered to the fuel in the fuel tank in proportion to the quantity of fuel added to the fuel tank, and producing control signals causing the electric pump to be energized to deliver to the fuel in the tank the determined quantity of fuel additive which is proportional to the quantity of fuel added to the tank, and
   an interrupt circuit for preventing the sending of said control signals if the difference between said second level and said third level is in excess of a predetermined value indicating the electric signal of said third level is invalid.

2. The apparatus according to claim 1 wherein said interrupt circuit further comprises:
   an attitude sensing switch for preventing the sending of said control signals if said fuel tank is: (i) not level or (ii) under acceleration.

3. The apparatus according to claim 1 wherein said interrupt circuit further comprises:
   a battery level detection circuit configured to prevent the sending of said control signals when a battery voltage is outside a predetermined operating range.

4. The apparatus according to claim 1 wherein said control circuit further comprises:
   a lookup table for determining said fixed amount of additive in response to the difference between said second and third levels.

5. The apparatus according to claim 4 wherein said electric pump comprises
   a positive displacement pump for adding a fixed amount of additive to fuel in said fuel tank for each pump stroke of said pump, and wherein a number of pump strokes is determined by said look-up table.

6. The apparatus according to claim 1 further comprising:
   a heat exchanger connected between said pump and said fuel tank to stabilize fluid viscosity at low temperatures of the additive.

7. The apparatus according to claim 5 wherein said control circuit further comprises:
   a memory for storing a maximum number of pump strokes prior to exhausting said supply of fuel additive;
   an error circuit configured to provide an error signal when said maximum number of pump strokes has occurred; and
   a counter circuit for decrementing the number of pump strokes in said memory.

8. The apparatus according to claim 7 wherein said memory stores the number of pump strokes as they occur for use in the event of an interruption of the operation of said apparatus.

9. The apparatus set forth in claim 1 further comprising means coupled to said pump for sensing operation of said pump and thereby confirming addition of said predetermined amount of additive to said fuel tank.

10. The apparatus set forth in claim 9 wherein said operation-sensing means comprises pressure switch means coupled to an output of said pump.

11. The apparatus set forth in claim 5 comprising operation-sensing means detecting each stroke of said pump and thereby determining the amount of additive added to fuel in said fuel tank by said pump.

12. The apparatus according to claim 1 wherein said fuel comprises diesel fuel and said additive comprises cerium.

13. The apparatus according to claim 1 wherein said electric pump comprises a positive displacement pump for adding a fixed amount of additive to fuel in said fuel tank for each pump stroke of said pump, and further comprising a register storing the number of pump strokes determined to be needed to deliver to the fuel tank a quantity of additive, and decrementing the register in response to the actual number of strokes of the electric pump when energized by the control circuit to deliver additive to the fuel tank.

14. The apparatus according to claim 1 wherein the control circuit further comprises a battery providing a voltage to the level sensor, and wherein the control circuit comprises an analog-to-digital converter receiving an electric signal from the level sensor, the actual battery voltage is a reference to the analog-to-digital converter, and the actual battery voltage is compared to the electric signal of the level sensor to improve the resolution of the level sensor.

15. A method of mixing a fuel additive to fuel in a fuel tank of a vehicle comprising the steps of:

providing a level sensor using an electric signal indicative of the level of fuel in the fuel tank;

providing an additive tank for holding a supply of fuel additive;

providing an electric pump connected with the additive tank for providing a predetermined precise amount of additive to fuel in the fuel tank in response to each delivery stroke of the pump;

providing an electronic control circuit having a microprocessor with a clock and a memory, the control circuit utilizing the electric signal of the level sensor to determine fuel levels, determining a first fuel level and storing the first fuel level in memory, determining at least one succeeding second fuel level lesser than the first fuel level and storing in memory such lesser second fuel level, subsequently determining a third fuel level significantly greater than the lesser second fuel level stored in memory, utilizing the third fuel level and the lesser second fuel level stored in memory to determine the number of pump strokes needed to deliver an amount of additive to fuel in the fuel tank in proportion to the quantity of fuel added to the fuel tank, and producing control signals causing the electric pump to be energized for the determined number of strokes of the electric pump to deliver the quantity of additive to fuel in the fuel tank, storing a determined maximum number of pump strokes in a register; and decrementing said register in response to said number of strokes.

16. A method of mixing a fuel additive to fuel in a fuel tank of a vehicle comprising the steps of:

providing a level sensor using an electric signal indicative of the level of fuel in the fuel tank;

providing an additive tank for holding a supply of fuel additive;

providing an electric pump connected with the additive tank for providing a predetermined precise amount of additive to fuel in the fuel tank in response to each delivery stroke of the pump;

providing an electronic control circuit having a microprocessor with a clock and a memory, the control circuit utilizing the electric signal of the level sensor to determine fuel levels, determining a first fuel level and storing the first fuel level in memory, determining at least one succeeding second fuel level lesser than the first fuel level and storing in memory such lesser second fuel level, subsequently determining a third fuel level significantly greater than the lesser second fuel level stored in memory, utilizing the third fuel level and the lesser second fuel level as stored in memory to determine the number of pump strokes needed to deliver an amount of additive to fuel in the fuel tank in proportion to the quantity of fuel added to the fuel tank, and producing control signals causing the electric pump to be energized for the determined number of strokes of the electric pump to deliver the quantity of additive to fuel in the fuel tank, and resampling said third level of fuel if the difference between said second level and said third level is in excess of a predetermined value indicating said third level is invalid.

17. The method according to claim 15 further comprising the steps of:

determining if said fuel tank is in a level position while determining said second level;

redetermining said second level if said fuel tank is not in said level position;

determining if said fuel tank is in a level position while determining said third level; and redetermining said third level if said fuel tank is not in said level position.

18. The method set forth in claim 15 comprising the additional step of monitoring operation of the pump to confirm the amount of additive added to the tank.

19. The method set forth in claim 18 wherein said pump comprises a fixed displacement pump, and wherein the amount of additive is controlled by controlling the number of strokes of the pump.

* * * * *